United States Patent [15] 3,701,135
Price [45] Oct. 24, 1972

[54] FOIL BEARING CONTROL APPARATUS

[72] Inventor: Robert H. Price, Minnetonka, Minn.

[73] Assignee: Control Data Corporation, Minneapolis, Minn.

[22] Filed: Oct. 29, 1970

[21] Appl. No.: 85,008

[52] U.S. Cl. ....................340/174.1 E, 179/100.2 P, 179/100.2 T, 226/97

[51] Int. Cl. ..........................................G11b 5/60

[58] Field of Search....179/100.2 P, 100.2 PM, 100.2 T; 226/97; 340/174.1 E, 174.1 C

[56] References Cited

UNITED STATES PATENTS 3,465,320 9/1969 Weidenhammer et al. ....................340/174.1 C
3,560,946 2/1971 Ehalt et al. ..........340/174.1 E

*Primary Examiner*—J. Russell Goudeau
*Attorney*—Joseph A. Genovese and Paul L. Sjoquist

[57] ABSTRACT

A magnetic recording apparatus in which a stationary magnetic recording strip ridges over a rotating drum on a cushion of air. Magnetic heads are located at the surface of the drum, for reading, writing, and erasing information on the magnetic strip. Both vacuum and positive air pressures are used to achieve spacing control between drum and strip. The vacuum pulls the strip down closer to the magnetic heads and the positive air pressure restores the strip to its previous flying height.

13 Claims, 4 Drawing Figures

INVENTOR.
ROBERT H. PRICE
BY Paul L. Sjoquist
Joseph A. Genovese
ATTORNEY

INVENTOR
ROBERT H. PRICE

BY Paul L. Sjoquist
Joseph A. Genovese
ATTORNEY

FOIL BEARING CONTROL APPARATUS

SUMMARY OF THE INVENTION

This invention relates to apparatus for the magnetic storage of information, and more particularly, to apparatus for the magnetic storage of information on a flexible recording strip which rides over a rotating drum on an air bearing, and further, in which both positive and negative air pressure are used to control the distance between strip and magnetic head.

Countless techniques have been devised for recording data on magnetic tape or other magnetic recording documents. In general, the same goals have been sought by all of these systems; that is, high reliability, high density recording, and speed.

To improve recording density, i.e., to record the maximum number of bits/inch, it was necessary to move document and head closer together. As they grew closer, the probability of document-head contact and/or entrained particle problems became higher. Either lowered the reliability of the system.

The traditional data processing approach is for a moving recording document to pass over a stationary recording head. High-speed motion of a flexible document, however, causes vibration and numerous handling problems.

To simultaneously improve speed, density, and reliability, a new approach was necessary. It is known in the prior art that a rotating magnetic head may be passed over a stationary recording document to read, write and erase information. The information passes to and from the recording heads through appropriate slip rings. The document may then be exchanged for another and stored.

Such an approach has a natural advantage. It is relatively easy to rotate a rigid body at a high RPM, and thus achieve the desired goal of high speed.

Any body moving at high speed through air will be surrounded by a zone of air moving with the body. The zone of air is generally referred to as a boundary layer and has certain properties. One of these is that the boundary layer can support a load, that is, act as a bearing surface. As long as the load is applied in such a way that the boundary layer does not break down, it will prevent physical contact between the rotating body and the supported body. Bodies which act in this way are commonly known as foil bearings.

A recording document wrapped about a portion of a rotating drum behaves as a foil bearing. This achieves the desirable goal of preventing document-to-head contact, which tends to improve reliability. The drum in one embodiment of the invention rotates at speeds of about 1,800 RPM. This yields a speed of about 2,000 inches/second at the surface of a drum of 12 inch radius. Such a surface speed creates a boundary layer so substantial that a light, flexible document flies too far above the surface to properly record the data.

A major factor determining recording density is the distance from the recording gap to the document. It was thus obvious that if a system were to utilize the speed and reliability features of the rotating head design, the boundary layer thickness would have to be controllable.

An approach which had some success was to place vacuum pressurized slots in the drum surface, rotationally preceding the heads. The vacuum would pull the document nearer the drum surface. The slots were, however, the axial length of the drum and reduced the flying height of the entire document. If the document was pulled down to an appropriate recording height, the air entrapped in the boundary layer would be forced to pass through an extremely narrow opening between document and head. Contaminants found in the air, as well as oxide flakes from the document, would contact and abrade both magnetic heads and the recording document. Thus, the desired reliability was adversely affected. This was so serious a problem that this approach has had little success.

The invention copes with this problem in a manner that yields an improved data recording system. The vacuum slot (or slots) of the prior art are replaced or supplemented with vacuum orifices mounted rotationally before the magnetic head. A vacuum source applies a controlled amount of vacuum to the strip through the orifices. The strip is partially deformed by the imposition of depressions in the recording document. A depression is created for each magnetic head. The strip is pulled very close to the magnetic head. This, however, is a small percentage of the magnetic strip width. Adequate space for air flow remains. There is no noticeable particle abrasion. The air merely flows around each depression, carrying particles which would have caused dirt buildup and wear on both documents and heads in the prior art system.

The invention may be practiced by itself or in combination with the vacuum slot which precedes the orifices. At the surface speeds and strip tensions of some embodiments of the invention, it is necessary to utilize the partial pulldown of a slot located before the orifice. Under other conditions of speed and strip tension, the use of vacuum slots may not be preferred.

The magnetic head moves past the recording document at about 0.00005 inches. The normal flying height can range from 0.003 to 0.010 inches depending on speed, tension, etc. The strip flies at 0.005 inches under the parameters established for a preferred embodiment. The flying height across the head is therefore about 1 percent of a typical strip flying height. Recording densities of 2,000 to 3,000 bits per inch are easily achieved with the invention.

Thus, high speed and high recording density are achieved without adversely affecting reliability.

It is thus the foremost object of the present invention to provide a magnetic recording recording apparatus with improved speed, reliability, and recording density.

It is a further object to avoid physical contact between magnetic head and the recording document, and still achieve satisfactory data density.

It is a further object to permit a rotating head type of recording system to achieve high reliability.

It is yet a further object to improve the operating performance of systems using vacuum slots.

A more complete understanding of the invention may be had by reference to the following descriptions, when taken in conjunction with the attached drawings.

DETAILED DESCRIPTION OF THE DRAWINGS

Figure 1:
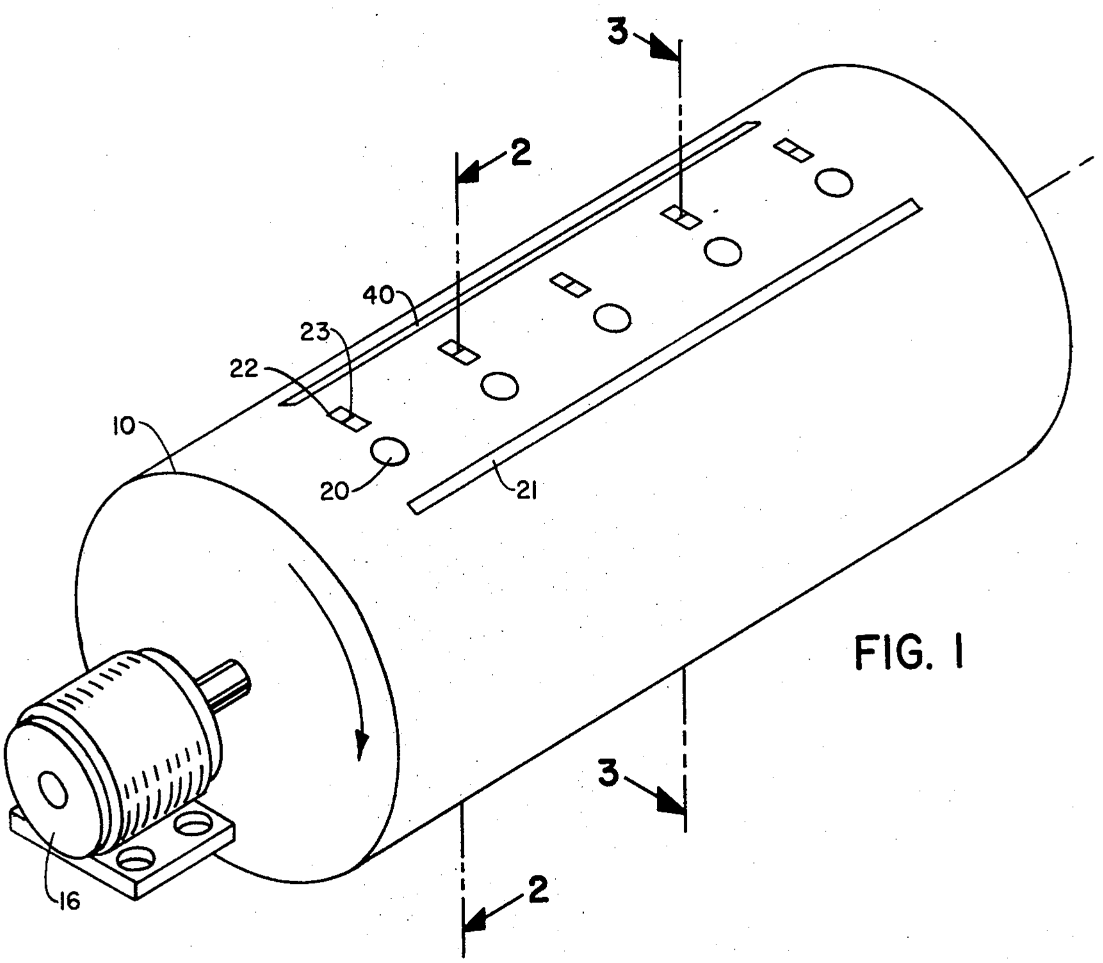
FIG. 1, perspective view of drum.
Figure 4:
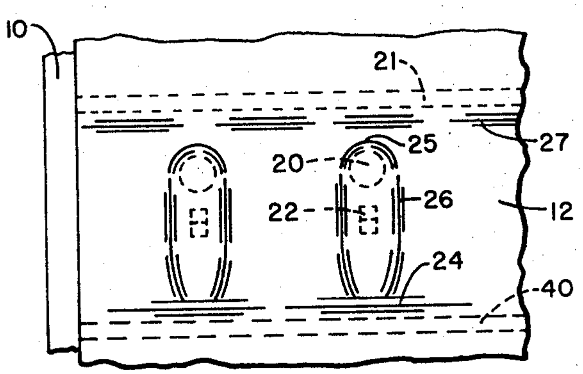
FIG. 4, top view of strip, in position on the drum.
Figure 2:
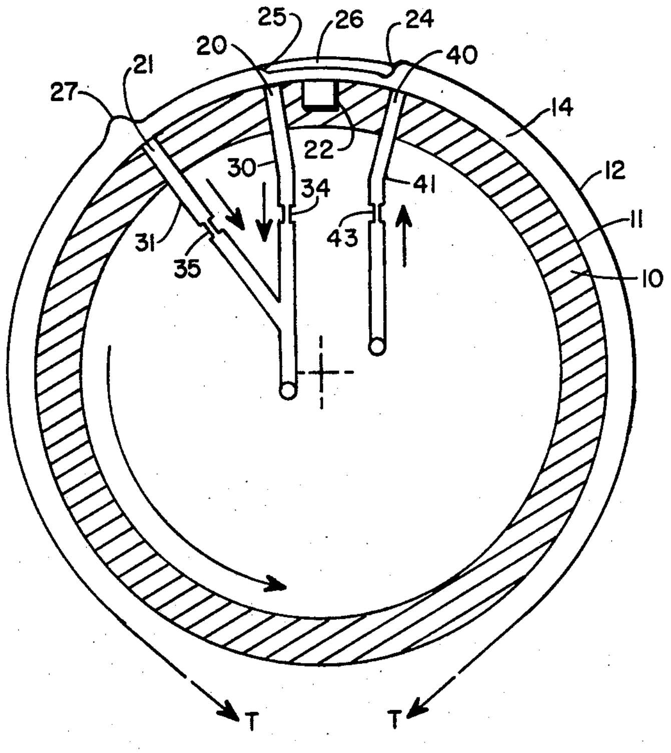
FIG. 2, cross-section of drum and strip along section 2—2.
Figure 3:
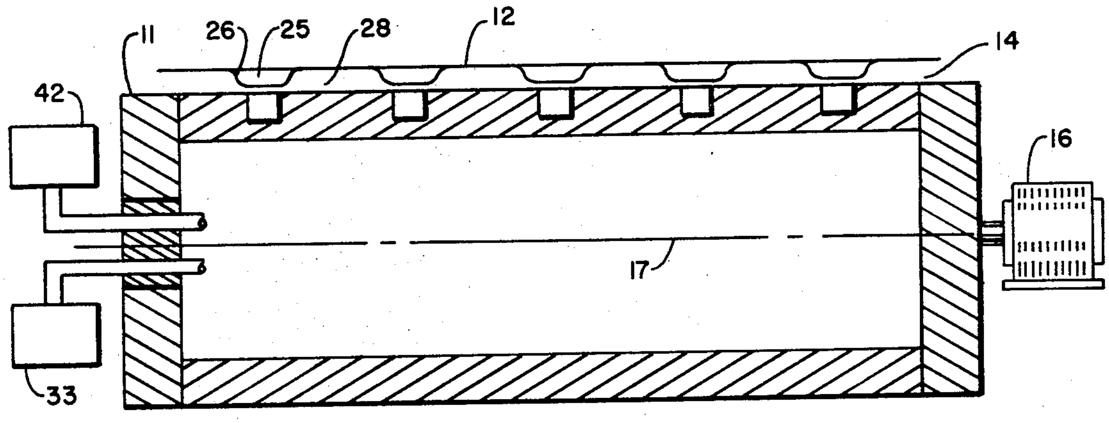
FIG. 3, cross-section of drum and strip along section 3—3 of FIG. 1.

The drawings illustrate a rotating drum 10 with magnetic strip, or recording document, 12 in place. The strip is held, under tension T, in a stationary position by wrapping it about a portion, approximately 270°, of the drum circumference. Conventional means, not shown, are used to locate and remove the strip 12 therefrom. Drum 10 rotates about axis 17 while the strip is being wrapped around it. As the drum rotates, it will carry with it a boundary layer 14 of air, or whatever gas it is immersed in. A boundary layer has the property of clinging to a moving surface and being able to support certain loads imposed upon it. The load must be applied evenly. Point-loading will break down the bearing at the point. Accordingly, surface 11 must be fairly smooth and continuous. The recording strip 12 is under tension T in operating position, to help apply the load evenly. Magnetic heads 22 are counter sunk in drum 10 so as to present the smoothest possible surface 11, over which the strip can fly. For purposes of magnetic recording with a rotating head system some minimal boundary layer always will be present. Generally speaking, the higher the drum surface speed, the greater the support capability of the boundary layer. The motor 16 is of sufficient capacity to provide a drum surface speed of about 2,000 inches/second, which insures a consistent load-carrying ability.

A foil bearing with a drum rotating at the above speeds will fly at from 0.003 inches to 0.010 inches above surface 11, depending on factors such as strip tension. Recording densities of 2,000 bits/inch or higher are possible only if there is a much smaller distance between the transducer and the recording document.

The flying height is reduced to a level appropriate for high density recording by the use of vacuum pressure applied to strip 12. This may be applied by combining vacuum pressurized orifices 20, located rotationally before magnetic heads 22, with the vacuum slot 21 of the prior art. It may also be applied by the application of vacuum only through the orifices 20. In general, the combination of a slot (or slots) and orifices will be the most successful for typical speeds, strip tensions, etc.

The slot 21 rotationally precedes the orifices and applies vacuum across most of the strip width. Conduit 31 connects the slot 21 to vacuum source 33. Control means 35, herein consisting of a calibrated restriction, assures that appropriate pressure levels will be felt by the strip. The strip responds to the vacuum applied by the slot with a reduction in the flying height across the length of the slot 21. This will approximate the width of strip 12. The strip has a tendency to temporarily rise before the reduction occurs. This phenomenon is shown in transition zone 27. The rise is due to the change in the mass flow characteristics of the entrapped air. The temporary rise occurs as a natural, if unexpected, result of the balancing of energies going on at the discontinuity. The flying height of the strip will then be reduced along the whole of slot 21.

The vacuum orifices 20 apply additional vacuum pressure to the recording document. They affect the strip by reducing the flying height only over the magnetic heads. Transition zone 25 illustrates the leading edge of the strip as it deflects in response to the orifice 20. It reaches the point of maximum deflection as it passes the rear edge of orifice 20. Transition zones 26 illustrate the edges of the depressed portion of the document. The strip is not measurably affected by the orifices 20 except directly following the orifices. It is essential that the strip fly at a uniformly low height over the entire width of recording gap 23. Therefore, orifice 20 must be of a diameter greater than the width of magnetic heads 22. For a magnetic head gap 0.01 inch wide, the orifice should be at least 0.03 inches, to insure proper coverage.

Orifices 20 are connected to vacuum source 33 through conduit 30. It is not essential that vacuum source 33 be external to the drum, as shown. Vacuum source 33 is subject to control means 34. Control means 34 may be any device which sets the vacuum pressure at the proper level. It is shown herein as a calibrated restriction. Multiple vacuum sources could be used to supply the vacuum required by slot 21 and orifices 20, so long as they have individual control mechanisms.

All of the pressure levels and deformations must operate within the elastic limit of strip 12. The strip is usually an oxide-coated material tradenamed Mylar. The control mechanisms 34 and 35 restrict the vacuum to operation at the appropriate vacuum levels.

The several individual deformations leave a large amount of the recording document undisturbed. This forms channels 28 which have a relatively large opening for air flow. It is through these channels 28 that the contaminants and abrasive particles pass. They follow the air around the depressions rather than being forced through narrow openings which could damage both the strip 12 and heads 22.

The individual deformations created by the vacuum orifices act as another foil bearing, superimposed on the original one. They will remain in effect until disturbed by an outside force. This is because the strip is so close to the surface (about 0.00005 inches) that there is virtually no area through which the air can enter to destroy the condition. Eventually, of course, the air pressure would eliminate the superimposed foil bearing. This will occur, however, substantially after the magnetic head has read or written the desired information.

There is then no need for the deformation to remain. To eliminate the possibility of undesirable side effects, a pressurized air port 40 is provided to restore the system to its original condition. This is supplied by pressure source 42 through conduit 41. Calibrated restriction 43 meters the applied pressure. The air pressure simply pushes the strip away from cylindrical surface 11 at point 24. The air pressure soon equalizes under the strip, and the superimposed foil bearing is destroyed.

Information read from a magnetic strip is sensed by the magnetic heads and fed via a rotary transformer to the appropriate station. Conversely, to record or erase information, the instructions are received through the transformer.

It is to be understood that the above description relates to a specific embodiment of the invention. Numerous changes may be made which fall within the intent of the invention but are not specifically referred to above.

What is claimed is:

1. Magnetic recording apparatus comprising:

a. cylindrical surface mounted for rotation about an axis;

b. a magnetic recording document having width no greater than the length of the cylindrical surface wrapped about at least a portion of the cylindrical surface, and supported a predetermined distance from the cylindrical surface by rotation of the surface;

c. a magnetic recording head mounted in said cylindrical surface; and d. first means applying a vacuum to said recording document for reducing the spacing between the cylindrical surface and the recording document only at the magnetic recording head in an area sufficiently narrow to axially deflect essentially all debris in the path of the magnetic head out of said path.

2. The apparatus of claim 1, in which the first means for applying the vacuum comprises an area located in said cylindrical surface, and containing an orifice axially even with said magnetic recording head, preceding said magnetic recording head in the direction of rotation, and having width greater than the width of said magnetic recording head.

3. The apparatus of claim 1, in which the first means for applying the vacuum comprises an area located in said cylindrical surface preceding said magnetic head in the direction of rotation, and containing an orifice axially even with said magnetic recording head.

4. The apparatus of claim 3, further including a second means for applying a vacuum to the recording document in the area preceding said orifice, such that the spacing between the cylindrical surface and the recording document is partially reduced between said area preceding the orifice and the orifice.

5. The apparatus of claim 4, in which the second means for applying a vacuum comprises an area of the cylindrical surface containing a slot perpendicular to the direction of travel of the magnetic recording heads.

6. The apparatus of claim 4, in which the second means for applying a vacuum comprises an area of the cylindrical surface containing a slot having a length substantially equal to the recording document width and oriented substantially perpendicularly to the direction of travel of the magnetic heads.

7. The apparatus of claim 4, in which both first and second means for applying a vacuum to the recording document include control means which limit the applied vacuum to a level such that it deforms the recording document but does not exceed the elastic limit of the material.

8. The apparatus of claim 3, further comprising third means for introducing pressurized gas to the area rotationally following said magnetic head such that the effects of the vacuum applied to the recording document will be substantially neutralized.

9. The apparatus of claim 8, in which there are a multiplicity of magnetic recording heads and the third means comprises an area following the heads and containing a slot in the drum surface substantially perpendicular to the direction of travel of said magnetic recording heads.

10. An improved magnetic recording apparatus of the type wherein a stationary recording document is wrapped about but does not physically contact a portion of a rotating drum which has a magnetic head mounted at the drum surface, such that the magnetic head can read, write, and erase data on the recording document while the drum rotates, wherein the improvement comprises first means for applying a vacuum to the recording document of sufficient magnitude to reduce the spacing between a portion of the recording document directly over the magnetic head and the drum surface, said reduced space portion being sufficiently narrow to cause essentially all debris in the path of the magnetic head to be axially deflected out of said path.

11. The apparatus of claim 10, in which the first means for applying the vacuum comprises an area located in the surface of said drum preceding said magnetic head in the direction of drum rotation, and containing an orifice axially even with said magnetic head.

12. The apparatus of claim 11, further including a second means for applying a vacuum to the recording document at a point rotationally preceding said orifice, such that the spacing between the cylindrical surface and the recording document is reduced between each point of application of the vacuum and the orifice.

13. The apparatus of claim 12, in which said second means for applying a vacuum to the recording document comprises an area of the drum surface containing a slot perpendicular to the direction of travel of said magnetic recording heads.

* * * * *

UNITED STATES PATENT OFFICE
CERTIFICATE OF CORRECTION

Patent No. 3,701,135 Dated October 24, 1972

Inventor(s) Robert H. Price

It is certified that error appears in the above-identified patent and that said Letters Patent are hereby corrected as shown below:

On the cover sheet in the ABSTRACT, line 2, "ridges" should read -- rides -- .

Signed and sealed this 8th day of May 1973.

(SEAL)
Attest:

EDWARD M.FLETCHER,JR.
Attesting Officer

ROBERT GOTTSCHALK
Commissioner of Patents

FORM PO-1050 (10-69)

USCOMM-DC 60376-P69
* U.S. GOVERNMENT PRINTING OFFICE : 1969 O—366-334.